United States Patent
Hoge et al.

[11] Patent Number: 5,967,931
[45] Date of Patent: Oct. 19, 1999

[54] TORODIAL TRACTION TRANSMISSION FOR ALL WHEEL VEHICLES

[75] Inventors: Forrest William Hoge, Whitmore Lake; Robert Clayton Roethler, Howell, both of Mich.

[73] Assignee: Ford Global Technologies, Inc., Dearborn, Mich.

[21] Appl. No.: 09/015,679

[22] Filed: Feb. 2, 1998

[51] Int. Cl.[6] ................................. F16H 37/02
[52] U.S. Cl. ..................... 475/216; 475/207; 475/210; 180/247
[58] Field of Search .................. 475/207, 210, 475/214, 215, 216, 217; 180/247

[56] References Cited

U.S. PATENT DOCUMENTS

| | | | |
|---|---|---|---|
| 2,292,066 | 8/1942 | Erban | 475/214 |
| 3,406,597 | 10/1968 | Perry et al. | 74/865 |
| 4,297,918 | 11/1981 | Perry | 74/690 |
| 4,464,952 | 8/1984 | Stubbs | 74/690 |
| 4,628,766 | 12/1986 | de Brie Petty | 74/690 |
| 4,641,548 | 2/1987 | Greenwood | 475/217 |
| 4,756,211 | 7/1988 | Fellows | 74/740 |
| 4,768,398 | 9/1988 | Greenwood | 74/691 |
| 4,922,788 | 5/1990 | Greenwood . | |
| 5,090,951 | 2/1992 | Greenwood | 475/216 |
| 5,217,418 | 6/1993 | Fellows et al. | 475/214 |
| 5,401,221 | 3/1995 | Fellows et al. | 475/214 |
| 5,564,998 | 10/1996 | Fellows | 475/216 |
| 5,842,945 | 12/1998 | Inoue | 475/207 |

FOREIGN PATENT DOCUMENTS

| | | | |
|---|---|---|---|
| 1-228-749 | 4/1971 | European Pat. Off. | 74/690 |
| 0-084-724-A1 | 8/1983 | European Pat. Off. | 475/216 |
| 0-149-892-A2 | 11/1984 | European Pat. Off. | 475/216 |
| 0-177-240-A2 | 9/1985 | European Pat. Off. | 475/216 |
| 2-100-372 | 1/1982 | United Kingdom | 475/216 |
| 2-136-893 | 9/1984 | United Kingdom . | |

Primary Examiner—Rodney H. Bonck
Assistant Examiner—Tisha D. Waddell
Attorney, Agent, or Firm—Frank G. McKenzie

[57] ABSTRACT

An automatic transmissions for an automotive vehicle includes a variator of the traction drive type, the variator including two input discs, two output discs, and rollers driveably engaged with the discs and adapted to vary continuously the ratio of the speeds of the output discs and input discs. Each of two planetary gearsets includes a carrier driven by an engine and driveably connected to an input disc, a sun gear driven by an output disc, and a sun gear connected to one of two driveshafts, which drive the front and rear wheels, respectively, of a motor vehicle. Independent angular variation of the rollers causes the variator to drive the forward drive sun gear and rear drive sun gear at different, variable speeds.

5 Claims, 1 Drawing Sheet

TORODIAL TRACTION TRANSMISSION FOR ALL WHEEL VEHICLES

BACKGROUND OF THE INVENTION

1. Field of the Invention

The present invention relates to automatic transmissions for automotive vehicles, and, more particularly, it pertains to a continuously ratio-varying transmission (CVT) unit of the toroidal race-rolling traction type with a split variator AWD traction.

2. Description of the Prior Art

Continuously variable transmissions of the toroidal race-rolling traction type are well known. CVTs of this type provide a continuously variable range of transmission ratios through the arrangement of possibly more than one epicyclic gear train. The engine drive variator has an output disc that delivers power to an epicyclic gear train that is also driven by an output shaft. More specifically, a variator output disc directly drives a sun gear of a planetary gearset.

CVT units of the toroidal race-rolling traction type wherein the output disc directly drives a sun gear of a planetary gearset are described in U.S. Pat. No. 4,756,211, EP Document 84,724, U.K. Patent 1,228,749, and U.K. Patent 2,136,893.

Multiple planetary gearsets incorporating a CVT transmission of the toroidal type is described in U.S. Pat. No. 4,768,398. The drive system described there includes two epicyclic gearsets. A first gearset provides a compound planet system by way of a second set of gears in the system. The annulus of the first epicyclic gearing provides drive to a final drive shaft and provides reverse drive by way of a second set of gears. Depending on the variator ratio, the first epicyclic gearing provides a forward speed, neutral or a reverse speed in low regime. The annulus of the second epicyclic gearing provides drive to the final drive shaft in high regime. This method, as well as those of the other mentioned patents, offer complex methods of gearset arrangement and application of the variator to gearset relationship.

It is therefore desirable to create a simpler but just as effective drive method.

SUMMARY OF THE INVENTION

It is an object of this invention to provide an automatic transmission with a continuously variable ratio range utilizing a toroidal-race rolling traction drive.

It is another object of this invention to provide a split variator traction drive adapted to drive both forward and rearward wheels of a motor vehicle.

According to the embodiment of the invention, there is provided a continuously variable transmission for an automatic transmission of an automotive vehicle comprising an input shaft driveably connected to the planet carriers of two gear units, one gear unit dedicated to forward drive and the second gear unit dedicated to reverse drive, half or full variator having two input discs, one output disc, rollers driveably engaging an input disc and output disc, each output disc of the toroidal variator driveably connected to a sun gear of each gearset, rollers adjustable to vary the output speed in relation to the input disc speed as the angular disposition of the rollers changes, angular positions of the rollers in each torus cavity controlled independently allowing the forward drive sun gear and rear drive sun gear to rotate at different speeds thereby creating a difference in torque magnitude between the front and rear wheels, ring gear of each gear unit providing output to the rear and the front drive wheels independently of each other. Also, the ring gear speed of both gearsets can be zero while the carrier and sun, respectively are rotating thereby allowing for a geared neutral condition.

BRIEF DESCRIPTION OF THE DRAWINGS

The FIGURE is a schematic diagram of a continuously variable transmission embodying the present invention.

DESCRIPTION OF A PREFERRED EMBODIMENT

Figure 1:
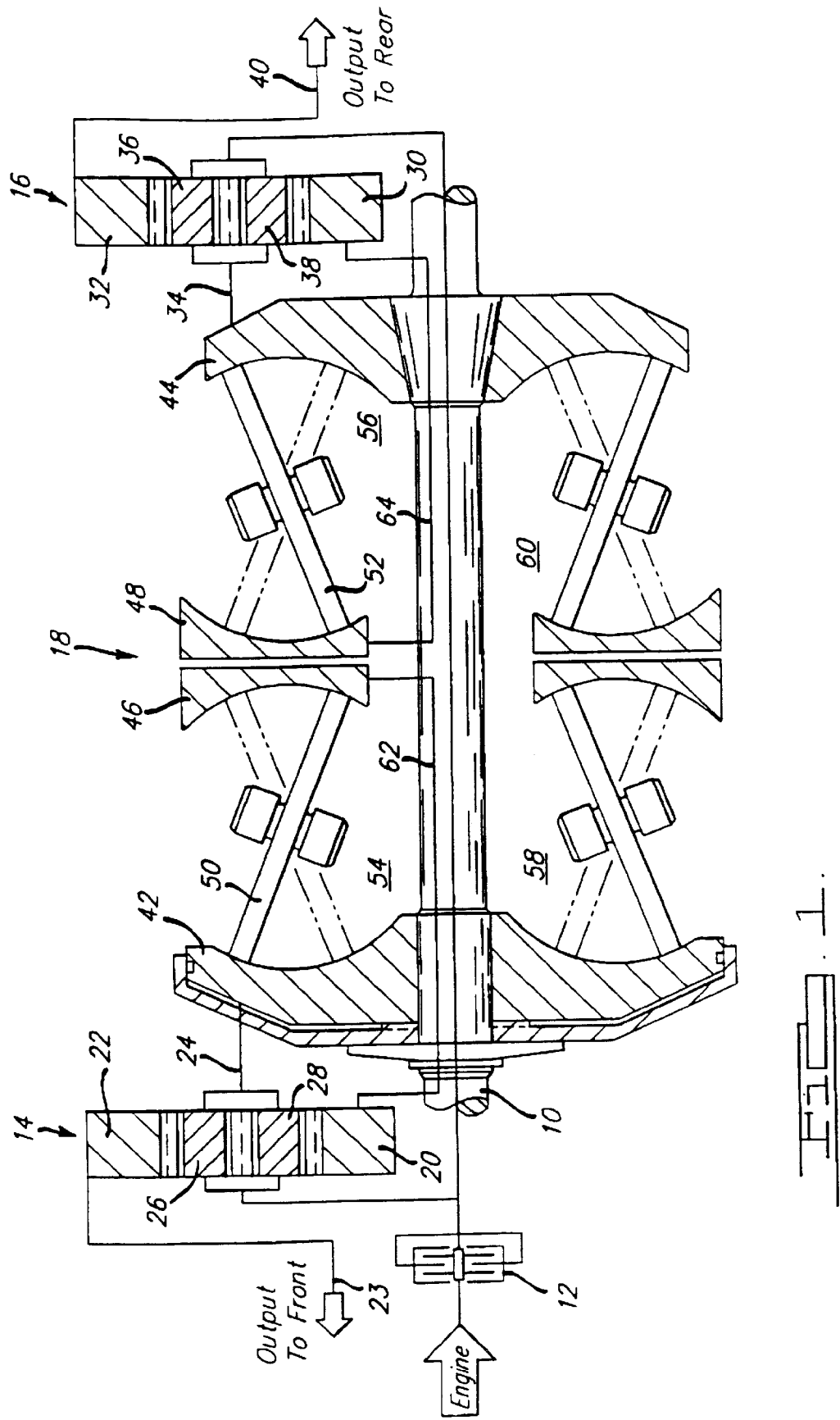

Referring to the FIGURE, a continuously variable transmission according to this invention includes an input shaft 10 driven by an internal combustion engine, electric motor or other power source through a clutch 12. The transmission includes a front drive planetary gearset 14, rear drive planetary gearset 16, variator 18 of the toroidal traction drive type, and various elements driveably connecting the components of the variator and gearsets.

Planetary gearset 14 includes a sun gear 20; ring gear 22 surrounding the sun gear, driveably connected to the front wheels of a motor vehicle through front output shaft 23; planet carrier 24, driveably connected to input shaft 10 and released therefrom through operation of clutch 12; a first set of planet pinions 26 supported rotatably on carrier 24 and in continuous meshing engagement with ring gear 22, and a second set of planet pinions 28 supported rotatably on carrier 24 and in continuous meshing engagement with sun gear 20 and the members of pinion set 26.

Planetary gearset 16 includes a sun gear 30; ring gear 32 surrounding the sun gear, driveably connected to the rear wheels of a motor vehicle through rear output shaft 40; planet carrier 34, driveably connected to input shaft 10 and released therefrom through operation of clutch 12; a first set of planet pinions 36 supported rotatably on carrier 34 and in continuous meshing engagement with ring gear 32, and a second set of planet pinions 38 supported rotatably on carrier 24 and in continuous meshing engagement with sun gear 30 and the members of pinion set 36.

Toroidal variator 18 includes input discs 42, 44, output discs 46, 48, toroidal cavities 54, 56, and toroidal cavities 58, 60 (if a full toroidal variator is used). Each cavity contains a set of spaced, rotating and angularly displaceable rollers 50, 52, each roller set driveably engaged with the input disc and output disc that bound and define the space of the corresponding toroidal cavity. The rollers transmit torque from discs 42,44 to discs 46,48. A ratio control mechanism tilts or rotates the axes of the rollers through arcs, thereby changing the location of contact of the rollers on the discs and the ratio of the speed of the output disc and speed of the input discs. Discs 46,48 rotate in the opposite direction from that of discs 42,44. Each input disc 42, 44 is driveably connected through a carrier 24 or 34, respectively, and clutch 12 to the engine shaft. Output disc 46 is driveably connected by a sleeve shaft 62 to sun gear 20; output disc 48 is driveably connected by a sleeve shaft 64 to sun gear 30. Carrier 24 is continuously driveably connected to input disc 42; carrier 34 is continuously driveably connected to input disc 44.

The angular positions of each set of rollers 50, 52 located in each toroidal cavity 54,56 may be varied mutually independently about axes directed substantially normal to the axis of input shaft 10. In this way the torque magnitude directed to the front and rear wheels may be mutually different or can be the same, if the speed ratio produced by the variator is the same for the front and rear drive systems.

The speed of each ring gear changes as the relative speed of the engine and variator output discs changes. The speed of each ring gear can be zero while the carrier and sun gear of the corresponding gearset rotate, allowing for a geared neutral operation as is described below.

In one application of this invention, sun gears 20,30 have 60 teeth, ring gears 22,32 have 180 teeth, pinions 28,38 have 60 teeth, and pinions 26,36 have 53 teeth. A forward low range having an overall speed ratio of 0.10 is produced by setting the angular position of the rollers 50,52 so that output discs 46,48 and sun gears 20,30 rotate at −1.7 times the speed of the engine, input shaft 10, and carriers 24,34. With the sun gears and carriers driven in this way, the speed of ring gears 22,32 and drive shafts 23,40 is 0.10 times that of the engine.

A forward high range having an overall speed ratio of 0.55 is produced by driving the output discs and sun gears at −0.350 times engine speed. The resulting speed of the ring gears and drive shafts is 0.55 times that of the engine.

By adjusting the angular portion of the rollers so that the output discs and sun gear rotate at −2.30 times engine speed, a reverse low range having a speed ratio of −0.10 results. The resulting speed of the ring gears and drive shafts is −0.10 times the engine speed.

A reverse high range having an overall speed ratio of −0.2833 is produced by driving the output discs and sun gears through variator 18 at −2.850 times the engine speed. The resulting speed of the ring gears and drive shafts is −0.283 times the engine speed.

Geared neutral operation results when the sun gears are driven at −2.00 times the engine speed and the carrier rotates at engine speed. This action drives pinions 28,38 at 3.0 times engine speed and pinions 26,36 at −3.396 times engine speed. Ring gears 22,32 do not rotate; therefore, neither drive shaft rotates and the powertrain operates in a neutral drive condition.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A continuously variable transmission for a motor vehicle having front and rear driving wheels, comprising:
   a variator including an input, an output, a continuously variable traction drive connection driveably engaging the input and output for continuously varying the speed of the output in relation to the speed of the input;
   a first planetary gear unit having a first component driveably connected to the variator output, a second component driveably connected to the variator input, and a first output driven at a variable multiple of the speed of the variator input; and
   a second planetary gear unit having a first component driveably connected to the variator output, a second component driveably connected to the variator input, and a second output driven at a variable multiple of the speed of the variator input.

2. A continuously variable transmission for a motor vehicle having front and rear driving wheels, comprising:
   a traction drive variator including a first input disc having a first surface, a first output disc having a second surface facing the first surface, rollers driveably engaging said first surface and second surface at variable positions on said surfaces and adapted to drive the output disc from the input disc at a speed that changes with the position of the rollers;
   a second input disc having a third surface, a second output disc having a fourth surface facing the third surface, rollers driveably engaging said third surface and fourth surface at variable positions on said surfaces and adapted to drive the second output disc from the second input disc at a speed that changes with the position of the rollers;
   a first planetary gear unit having a sun gear driveably connected to the first output disc, a ring gear surrounding the sun gear, a first carrier adapted for alternate connection to and release from a power source, a first set of planet pinions rotatably supported on the first carrier and meshing with the sun gear, a second set of planet pinions rotatably supported on the first carrier and meshing with the ring gear and the first set of planet pinions; and
   a second planetary gear unit having a second sun gear driveably connected to the second output disc, a second ring gear surrounding the second sun gear and driveably connected to the front driveshaft, a second carrier adapted for alternate connection to and release from a power source, a third set of planet pinions rotatably supported on the second carrier and meshing with the sun gear, a fourth set of planet pinions rotatably supported on the second carrier and meshing with the second ring gear and the third set of planet pinions.

3. The transmission of claim 2 further comprising:
   a front driveshaft driveably connected to the ring gear and;
   a rear driveshaft driveably connected to the second ring gear.

4. The transmission of claim 2 wherein the first and second surfaces define a toroidal cavity substantially concentric about an axis of rotation, within which cavity the rollers are located, the rollers being angularly displaceable with respect to said axis.

5. The transmission of claim 2 further comprising:
   a clutch for alternately driveably completing and releasing a drive connection between an engine and the carriers and input discs.

* * * * *